United States Patent [19]
Morin, Jr.

[11] Patent Number: 5,564,745
[45] Date of Patent: Oct. 15, 1996

[54] AUTOMOTIVE SAFETY CHASSIS

[76] Inventor: Karl V. Morin, Jr., 1077 Crest View Rd., Vista, Calif. 92083

[21] Appl. No.: 575,798

[22] Filed: Dec. 22, 1995

[51] Int. Cl.⁶ .................................................. B60R 21/02
[52] U.S. Cl. ............................................................. 280/784
[58] Field of Search ............................... 280/784; 180/274

[56] References Cited

U.S. PATENT DOCUMENTS

| | | | |
|---|---|---|---|
| 4,826,209 | 5/1989 | Farris | 280/784 |
| 5,195,779 | 3/1993 | Aoyama et al. | 280/784 |
| 5,251,911 | 10/1993 | Blake | 280/784 |
| 5,275,436 | 1/1994 | Pomero | 280/784 |

*Primary Examiner*—Kennth R. Rice
*Attorney, Agent, or Firm*—Loyal M. Hanson

[57] ABSTRACT

A chassis constructed according to the invention includes a main frame and at least two breakaway subframes on which are mounted the left and right front wheels and associated suspension components. The main frame narrows forwardly. It has a midsection and left and right sides that extend from the midsection to a forward end of the main frame, the forward end being less than one-half the width of the midsection, preferably a near point. The rearward portion of the main frame is preferably also pointed, with two additional breakaway subframes for the left and right rear wheels. Breakapart components hold the subframes on the main frame so that each subframe will separate from the main frame if it is subjected to an impact of predetermined characteristics. Breakapart linkage coupling components connect the steering linkage to the front subframes while shaft coupling components may be provided for coupling rotational drive components to the subframes.

10 Claims, 4 Drawing Sheets

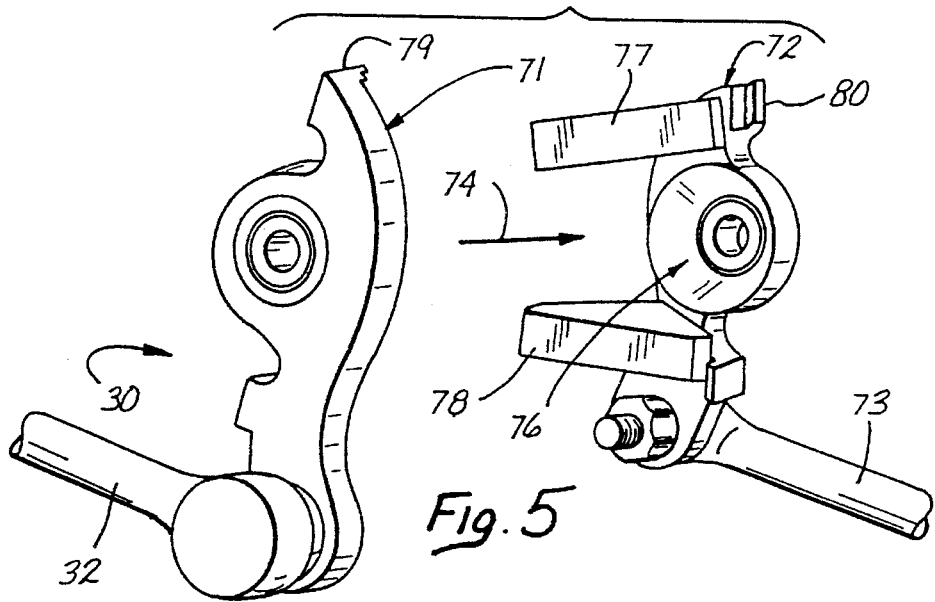
Fig. 5
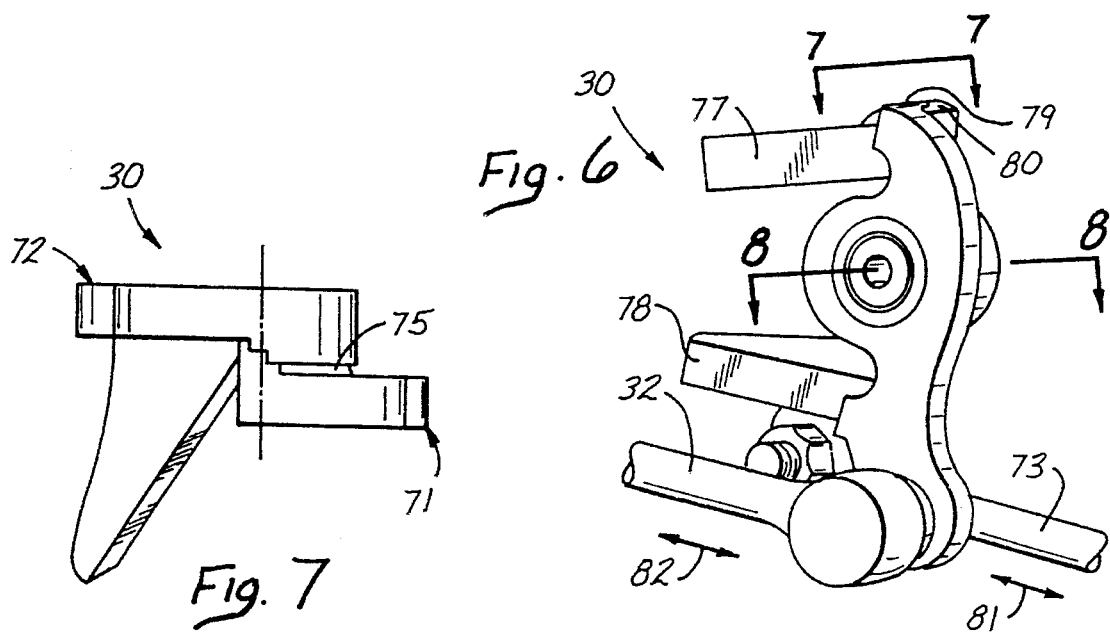
Fig. 6
Fig. 7
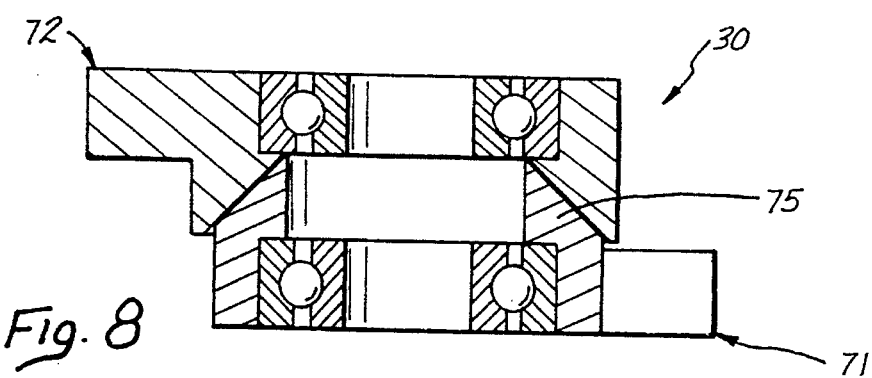
Fig. 8

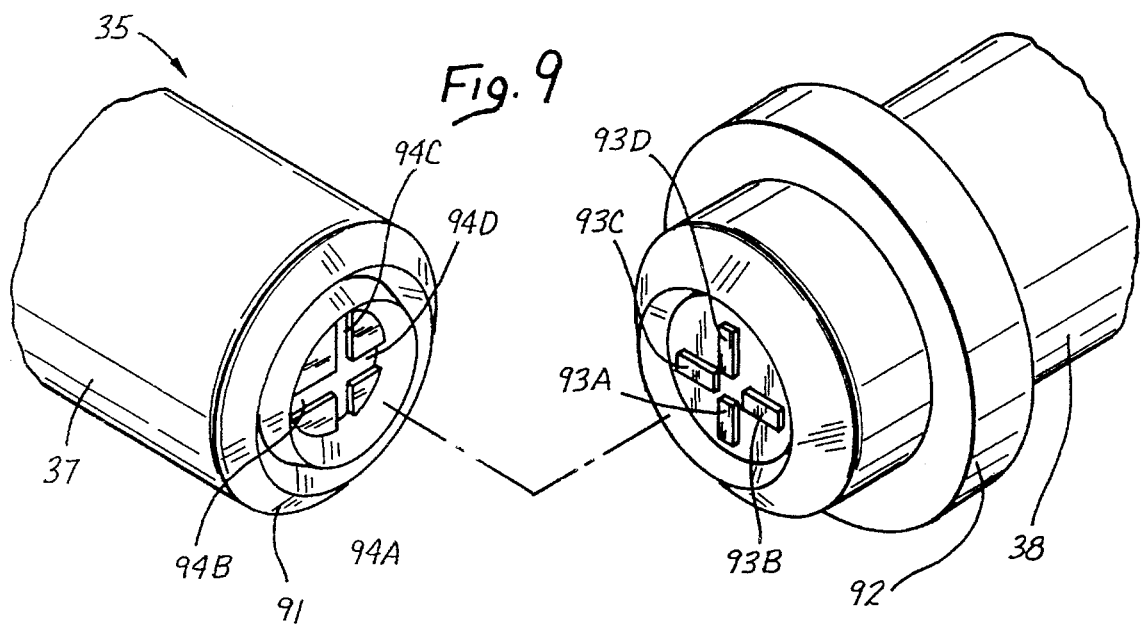
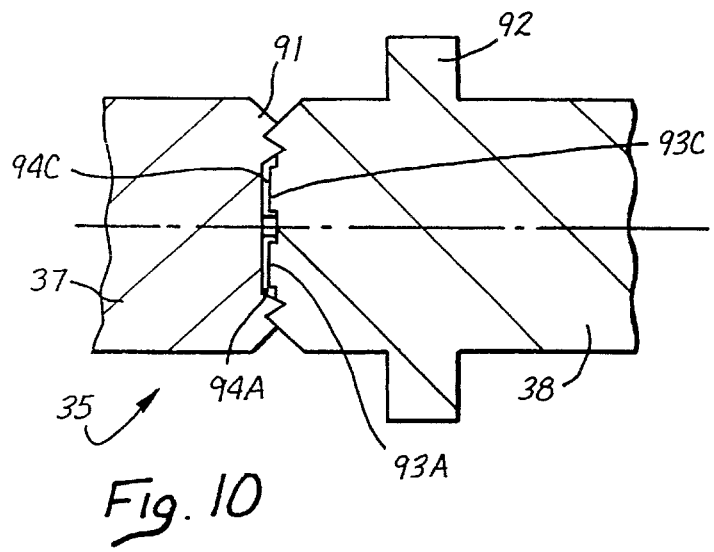

AUTOMOTIVE SAFETY CHASSIS

BACKGROUND OF THE INVENTION

1. Technical Field.

This invention relates generally to automobiles and other motor vehicles, and more particularly to an automotive chassis that provides greater safety and less damage when subjected to a crash, coupled with more convenient and less expensive repairability.

2. Description of Related Art.

The impact of a headon collision bends the chassis, damages the suspension and other components mounted on the chassis, and hurls occupants against the car interior. Severe damage to persons and property results, even at low speeds. To encourage better designs, some governmental regulations have specified allowable damage levels for passenger cars when driven headon into a brick wall, and safer designs have resulted.

But despite the many improvements made over the years, motor vehicles are still not very safe in a crash situation. An impact can still abruptly stop the chassis as the occupants hurl against the interior. In addition, damage to the chassis, the suspension, and other components can still involve significant repair time and expense. So, owners and operators continue to need improvements in motor vehicle designs, for more safety, less damage, and better repairability.

SUMMARY OF THE INVENTION

This invention alleviates the problems outlined above by providing an automotive chassis having a triangularly shaped main frame outfitted with breakaway subframes that support the wheels and suspensions. The triangular shape results in more impact to the breakaway subframes instead of the main frame. Separability of the subframes under sufficient impact significantly limits transfer of force to the main frame.

Thus, the invention protects the main frame from the impact. The main frame is less likely to abruptly stop while the passengers hurl against the interior. Less damage occurs to the main frame and the components mounted on it. Repair focuses on replaceable subframes, making the automotive chassis of this invention significantly more convenient and less expensive to repair.

The main frame is triangularly shaped in the sense that it is narrower at the front than at the middle, and it includes left-front and right-front breakaway subframes for the left-front and right-front wheels and suspensions. In other words, the main frame narrows forwardly, from a wider midsection of the main frame to a narrower forward portion or the main frame, preferably narrowing to a near point. It preferably also narrows rearwardly, from the wider midsection to a narrower rearward portion (to a near point), and it preferably includes left-rear and right-rear breakaway subframes for the left-rear and right-rear wheels and suspensions.

To paraphrase some of the claim language subsequently presented, a chassis constructed according to the invention includes a main frame and at least two breakaway subframes on which are mounted the left-front and right-front wheels and associated suspension components. The main frame has a forward end, a rearward end, and a midsection intermediate the forward and rearward ends. It also has a first side extending from a left side of the midsection to the forward end, a second side extending from a right side of the midsection to the forward end, a third side extending from the left side of the midsection to the rearward end, and a fourth side extending from the right side of the midsection to the rearward end.

The midsection has a first width and the forward end has a second width less than one-half the first width. Preferably, the first and second sides converge to a near point at the forward end so that the forward portion of the main frame is triangularly shaped. Preferably, the rearward portion of the main frame is also triangularly shaped, with the third and fourth sides converging to a near point at the rearward end and the chassis including breakaway subframes for the left and right rear wheels.

Means are included for holding the subframes on the main frame so that each subframe will break away from the main frame when subjected to an impact of predetermined characteristics. For that purpose, one embodiment uses interlocking first and second components (e.g., a V-shaped positioning guide component and a spool component) attached to respective ones of the first subframe and the main frame. Those two components interlock to guide the subframe into position alongside the main frame and to prevent translational movement of the subframe relative to the main frame both vertically and sideways. A shear pin extending through the first and second components prevents forward and rearward translational movement relative to the main frame. The shear pin is designed to shear off when the subframe is subjected to an impact of the predetermined characteristics in order to thereby enable the subframe to separate from the main frame in response to the impact.

Linkage coupling means are provided for coupling steering linkage components on the subframes to steering linkage components on the main frame. Suspension rods may be connected in a similar manner. Shaft coupling means may be provided for coupling rotational drive components on the subframes to the rotational drive components on the main frame. Of course, electric drive components can be mounted directly on the subframes instead. The following illustrative drawings and detailed description make the foregoing and other objects, features, and advantages of the invention more apparent.

BRIEF DESCRIPTION DRAWINGS

FIG. 1 the drawings is a diagrammatic representation of an automobile chassis constructed according to the invention that has four breakaway subframes held on a main frame with several breakapart frame connectors;

FIG. 5 is a three-dimensional view of one breakapart linkage connector with its two major components separated;

FIG. 6 is a three-dimensional view of the breakapart linkage connector with its two major components assembled;

FIG. 7 is a top view of the breakapart linkage connector taken on line 7—7 of FIG. 6

FIG. 8 is a cross-sectional view of the breakapart linkage connector taken on line 8—8 of FIG. 6;

FIG. 9 is a three-dimensional view of a breakapart shaft connector with its two major components separated; and FIG. 10 is a longitudinal cross-sectional view of the breakapart shaft connector with its two major components assembled.

DESCRIPTION OF THE PREFERRED EMBODIMENTS

Figure 1:
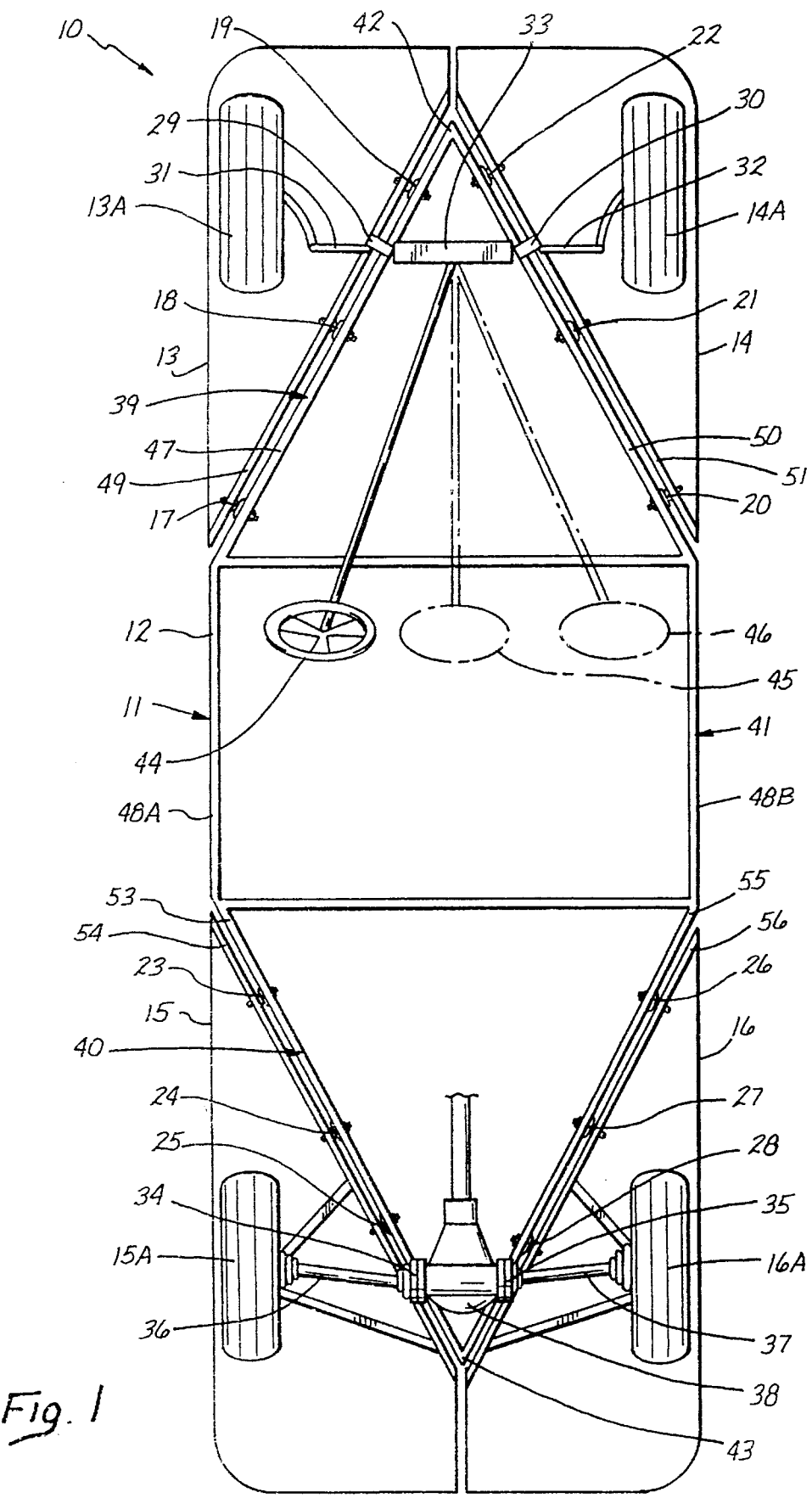

FIG. 1 of the drawings shows a passenger automobile 10 having a chassis constructed according to the invention. Designated generally in FIG. 1 as a chassis 11, it includes a main frame 12 and four subframes 13–16. A wheel and associated suspension components are mounted on each of the subframes 13–16. The wheels and associated suspension components are represented just very generally in FIG. 1 at reference numerals 13A, 14A, 15A and 16A.

Several frame connectors 17–28 hold the subframes 13–16 on the main frame 12 so that each of the subframes 13–16 separates from the main frame 12 (i.e., breaks away) under sufficient impact (e.g., in a crash). The subframes 13–16 are therefore sometimes referred to as breakaway subframes. The frame connectors 17–19 hold the first subframe 13 on the main frame 12. The frame connectors 20–22 hold the second subframe 14, the frame connectors 23–25 hold the third subframe 15, and the frame connectors 26–28 hold the fourth subframe 16.

Each of the frame connectors 17–28 is adapted to separate or break apart under sufficient impact (i.e., shearing force) so that the subframes 13–16 will separate from the main frame 12 under the impact. When either one of the first and second subframes 13 and 14 separates, an associated one of first and second steering linkage connectors 29 and 30 disengages a respective one of first and second steering linkages 31 and 32 from a rack-and-pinion or other suitable steering component 33. When either one of the third and fourth subframes 15 and 16 separates, an associated one of first and second shaft connectors 34 and 35 disengage a respective one of first and second half-shafts 36 and 37 from a differential component 38. Breakapart electrical and hydraulic connectors are not illustrated, but one of ordinary skill in the art can provide them as required to couple electrical and hydraulic components on the main frame 12 to associated components on the subframes 13–16.

The breakaway subframes 13–16, coupled with the shape of the main frame 12, result in significantly less impact to the main frame 12 in many crash situations. As shown in FIG. 1, the main frame 12 includes both a triangularly shaped forward portion 39 and a triangularly shaped rearward portion 40. In other words, the outlines of the forward and rearward portions 39 and 40 in a horizontal plane are triangularly shaped as illustrated.

According to the broader aspects of the invention, the main frame 12 narrows forwardly from a midsection 41 of the main frame 12 to a forward end 42 having a width less than one-half the width of the midsection. Preferably, it also narrows rearwardly to a rearward end 43, and it narrows both forwardly and rearwardly in the triangularly shaped frame configuration illustrated, to a point or near point at each of the forward and rearward ends 42 and 43.

With the main frame 12 shaped that way, the impact of a headon crash or a crash from the rear will most probably impact one or more of the subframes 13–16 instead of the main frame 12, especially when the forward and rearward ends 42 and 43 are near points as illustrated. As a result, when that impact is sufficiently large to one of the subframes 13–16, the affected subframe breaks away from the main frame 12 leaving the main frame relatively unaffected. Significantly less force is transmitted to the main frame 12, and so less damage results to the main frame 12, to components mounted on the main frame 12, and to the driver and any passengers. In addition, the resulting modular chassis design just described promotes quick, convenient, and far less expensive repair. Racing crews can quickly replace a faulty suspension or bearing on a race car by replacing the whole subframe.

From the above and subsequent descriptions, one of ordinary skill in the art can make any of various changes in the illustrated design without departing from the inventive concepts disclosed. In other words, a chassis constructed according to the invention includes a main frame that narrows forwardly (preferably, both forwardly and rearwardly), and at least two breakaway subframes, one for each of the front wheels (preferably, for one for each of all four wheels in a four-wheel car). In addition to those components, it includes breakapart frame connectors for each of the subframes. It may include whatever breakapart linkage, shaft, electrical, and hydraulic connectors are called for by the particular design for coupling translational movement, rotational movement, electrical energy, and hydraulic fluid to the subframes. So, one of ordinary skill in the art can vary the precise shape of the main frame 12 and subframes 13–16, he can implement the main frame 12 and the subframes 13–16 with metal rails, ribbed sheets or panels formed of composite material, or with any of various materials and designs, and he can even provide electrical motors or other power source mounted on the subframes for each of the wheels, all within the broader inventive concepts disclosed.

With further regard to FIG. 1, it is not to scale and it exaggerates the space between the main frame 12 and the subframes 13–16 for illustrative convenience. One of ordinary skill in the art can set the spacing as desired according to the particulars of the breakapart connectors 17–28 and the various linkage, shaft, electrical, and hydraulic coupling components employed. FIG. 1 depicts crush zones by the body material ahead of the front wheels and behind the rear wheels. In addition, FIG. 1 shows a steering wheel 44 on the left side of the midsection, although the steering wheel can be located in the center or to the right as depicted by dashed lines at reference numerals 45 and 46. Although FIG. 1 shows a four-wheeled vehicle, a three-wheel design with one rear wheel may embody the invention without departing from the broader claims subsequently presented.

Concerning some of the nomenclature employed, the forward portion 39 of the main frame 12 includes a frame member referred to subsequently as a first or left-front side 47 that extends from a left side 48A of the midsection 41 to the forward end 42 of the main frame 12. The left-front side 47 faces a frame member of the first subframe 13 referred to subsequently as a first inwardly facing side 49 of the first subframe 13. Similarly, the forward portion 39 includes a second or right-front side 50 extending from a right side 48B of the midsection 41 to the forward end 42. The right-front side 50 faces a second inwardly facing side 51 of the second subframe 14.

Similarly, the rearward portion 40 of the main frame 12 includes a third or left-rear side 53 extending from the left side 48A of the midsection 41 to the rearward end 43 of the main frame 12. The left-rear side 53 faces a third inwardly facing side 54 of the third subframe 15. The rearward portion 40 also includes a fourth or right-rear side 55 extending from the right side 48B of the midsection 41 to the rearward end 43. The right-rear side 55 faces a fourth inwardly facing side 56 of the fourth subframe 16.

The frame members or sides may include any of various other design particulars not specified above. They may, for example, include rails or panels and be composed of metal and/or composites. The shape of the main frame 12 and separability of the subframes 13–16 (i.e. ability to break away under an impact of predetermined characteristics) are the essential attributes of a chassis constructed according to the invention. One of ordinary skill in the art can include additional frame members, pans, and so forth according to any of various design criteria.

The impact characteristics of an impact sufficient to cause separation of one of the subframes 13–16 from the main frame 12 include the direction of the impact (e.g., greatest force component is directed at the automobile 10 from the front or rear parallel to its length) and the force of the impact (e.g., a force equivalent to running headon into a stationary brick wall while traveling at twenty miles per hour, or other specified speed). The shape of the main frame 12 and the position of the subframes 13–16 combine to enable separability for impacts directed from the front and rear. The particulars of the breakapart connectors 17–28 determine the force of impact required to cause separation. Based upon the foregoing and subsequent descriptions, one of ordinary skill in the art can design those components to break apart for an impact of specified characteristics.

At least three breakapart connectors hold the subframe 13 on the main frame 12, although more may be used according to the particular design. The same three-or-more rule applies for each of the other subframes 14–16. Preferably, the breakapart connectors are staggered in height so that they do not interfere with one another when a subframe separates from the main frame 12. In other words, each of the breakapart connectors for a particular one of the subframes 13–16 is at a different height than the other ones for the same subframe. The various linkage, shaft, electrical, and hydraulic coupling components are preferably set at different heights also for the same reason.

Figure 2:
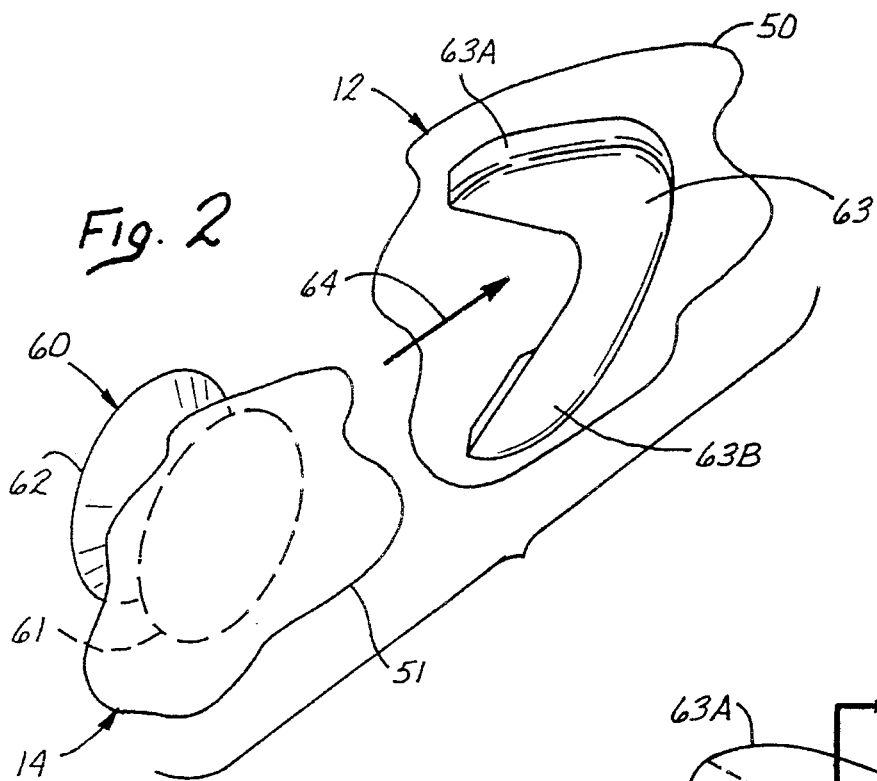
FIG. 2 is three dimensional view of a portion of the safety chassis showing one of the breakapart frame connectors with its two major components separated.
Figure 3:
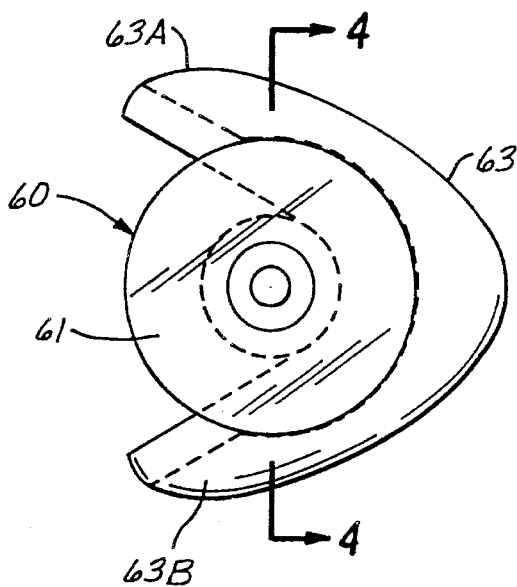
FIG. 3 is a front view of the breakapart frame connector apart from the main frame and subframe with the two major components assembled.
Figure 4:
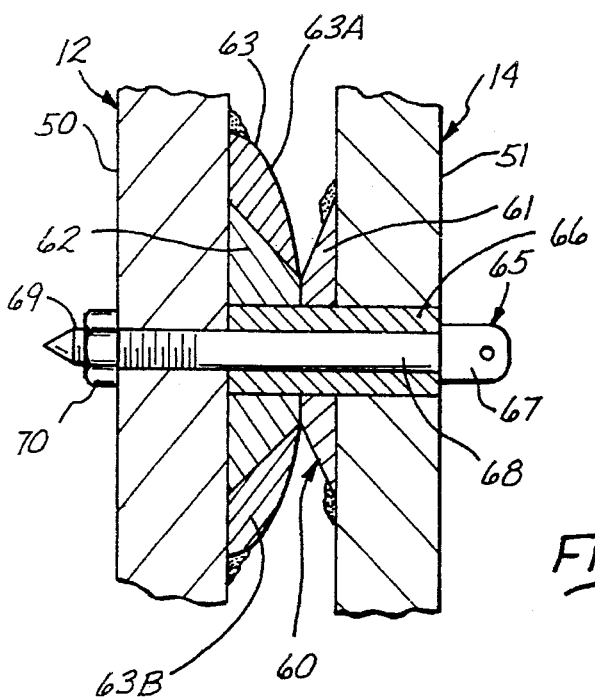
FIG. 4 is a cross sectional view of the breakapart frame connector taken on line 4—4 of FIG. 3 with the connector welded onto the main frame and subframe.

Further details of the breakapart connectors 17–28 are shown in FIGS. 2–4 with reference to the breakapart connector 20. Since the breakapart connectors 17–28 are all similar in details of construction, only details of the breakapart connector 20 are described in further detail. It combines with the breakapart connectors 21 and 22 to hold the right-front subframe 14 on the main frame 12. They lock the subframe and main frame together for normal operation, and separate upon sufficient impact or when shear pins are manually pulled.

The breakapart connector 20 includes a first component composed of metal or other suitably strong, rigid material that is referred to as a spool 60 (FIGS. 2–4). The spool 60 includes a first part 61 that is welded or otherwise suitably attached to the inwardly facing side 51 of the subframe 51, and a second part 62 that is bolted or otherwise suitably attached to the first part 61. The breakapart connector 20 also includes a second component composed of metal or other suitably strong, rigid material that is referred to as a positioning guide 63. It is welded or otherwise suitably attached to the right-front side 50 of the main frame 12.

Moving the subframe 14 forwardly as depicted by an arrow 64 in FIG. 2, causes the spool 60 to seat between fingers 63A and 63B of the positioning guide 63, and that holds the subframe 14 in desired alignment with the main frame 12. Once aligned that way, a shear pin 65 (FIG. 4) is advanced through a bushing 66 that extends through a hole in the inwardly facing side 51 of the subframe 14 and a hole through the spool 60 to the right-front side of the main frame 12. The shear pin 65 has an enlarged head 67 and a smaller diameter shank 68 that extends from the bushing 66 through a hole in the right-from side of the main frame 12 to a distal end 69 of the shank. A nut 70 on the distal end 69 holds the shear pin 65 in place.

A force fit through the right-from side 50 of the main frame 12 may be used instead of the nut 70, especially in racing applications where quick replacement is desired compared to passenger car applications. Another advantage of a force-fit construction without a nut is that if the shear pin 65 fails to shear completely off, the shear pin 65 can overcome the force fit and separate from the main frame 12 with the bushing 66.

Based upon the foregoing, one of ordinary skill in the art can design the shear pin 65 so that it shears off (or pulls free in a force-fit construction) and the subframe 14 separates from the main frame 12 when the subframe 14 is subjected to an impact having the specified characteristics. When the subframe 14 separates, the right-front subframe 14 moves rearwardly relative to the main frame 12, and the breakaway steering linkage connector 30 breaks apart. Depending on the particular design and the particular subframe affected, various shaft, electrical, and hydraulic coupling components break apart also.

Further details of the breakapart steering linkage connectors are shown in FIGS. 5–8 with reference to the steering linkage connector 30. Since the steering linkage connectors 29 and 30 are similar in details of construction, only details of the steering linkage connector 30 are described in further detail. It connects steering push-pull rods with a quick secure connection when the subframe is installed and a very quick disconnect upon separation. Suspension rods may be connected in the same manner.

The linkage connector 30 includes a first or male component 71 that is connected pivotally to the steering linkage 32 in FIG. 1. It also includes a second or female component 72 that is connected pivotally to a linkage 73 (FIGS. 5 and 6). The linkage 73 is connected to the rack-and-pinion or other steering component 33 shown in FIG. 1. The male and female components are composed of metal or other suitably strong, rigid material.

As the spool 60 and positioning guide 63 advance in the direction of the arrow 64 in FIG. 2 to aligned the subframe 14 with the main frame 12, the male component 71 advances in the direction of an arrow 74 in FIG. 5 towards the female component 72. As that occurs, a circular protrusion 75 on the male component 71 (FIGS. 7 and 8) seats in a circular recess 76 in the female component 72 (FIG. 5) while alignment ramps 77 and 78 align the male and female components 71 and 72 relative to each other so that: a locking tab 79 on the male component 71 (FIGS. 5 and 6) engages a locking tab 80 on the female component 72 as illustrated in FIG. 6.

With the male and female components 71 and 72 connected that way, translational movement of the linkage 73 depicted in FIG. 6 by a double-headed arrow 81 is coupled to the steering linkage 32 as depicted by a double-headed arrow 82. When the breakapart connectors 20–22 separate under an impact, however, the male and female components 71 and 72 of the steering linkage connector 30 separate. In other words, they dislodge or break apart. The impact forces the subframe 14 rearwardly relative to the main frame 12, thereby moving the male component 71 rearwardly relative to the female component 72. Of course, one of ordinary skill in the art can design other connectors for coupling translational movement across the interfaces of the subframes and the main frame without departing from the broader claims subsequently presented.

Further details of the breakapart shaft connectors are shown in FIGS. 9 and 10 with reference to the shaft connector 35. Since the shaft connectors 34 and 35 are similar in details of construction, only details of the shaft connector 35 are described in further detail. In normal operation, it connects rotational movement of the differential component 38 to the half-shaft 37. When the subframe 16 separates from the main frame 12, the shaft connector 35 separates also.

The shaft connector 35 includes a first component 91 and a second mating component 92. The illustrated first component 91 is formed as part of the half-shaft 37, although a separate component may be attached to the half-shaft 37 instead. Similarly, the second component 92 is formed as part of the differential shaft 38, although a separate component may be attached instead.

The second component 92 includes several protrusions labelled 93A through 93D in FIG. 9. They protrude axially from the second component 92. The first component 91 includes an equal number of mating recesses labelled 94A through 94D. They mate with the protrusions.

As the subframe 16 is aligned with the main frame 12 by the connectors 26–28, the first and second components 91 and 92 come together to the position shown in FIG. 10, with the protrusions 93A–93D seated with the recesses 94A–94D. Rotational movement of the differential shaft 38 is thereby coupled to the half-shaft 37 in normal operation. When the subframe 16 separates from the main frame 12, the first component 91 separates from the second component 92.

Of course, one of ordinary skill in the art can design other connectors for coupling rotational movement across the interfaces of the subframes and the main frame without departing from the broader claims subsequently presented. From the foregoing descriptions, one of ordinary skill in the art can also provide suitable breakapart electrical and hydraulic connectors as required to couple electrical and hydraulic components on the main frame 12 to associated components on the subframes 13–16.

One way of coupling a first hydraulic line coming from a master brake cylinder on the main frame to a second hydraulic line going to a brake on a subframe, is to convert the hydraulic pressure to mechanical force, couple the mechanical force from the main frame to the subframe, and then convert the mechanical force back to hydraulic pressure. Doing so avoids loss of fluid when the subframe separates from the main frame.

Such a coupling is accomplished in one embodiment, for example, with a first piston on the main frame that is connected to the first hydraulic line and a second piston on the subframe that is connected to the second hydraulic line. The pistons are arranged to abut one another in normal operation so that a change in hydraulic pressure in the first line results in movement of the pistons and a corresponding change in hydraulic pressure in the second line. When the subframe separates from the main frame, the abutting pistons separate without loss of fluid.

Thus, the invention provides an automotive chassis having a triangularly shaped main frame outfitted with breakaway subframes that support the wheels and suspensions. The invention protects the main frame from the impact. The main frame is less likely to abruptly stop while the passengers hurl against the interior. Less damage occurs to the main frame and the components mounted on it. Repair focuses on replaceable subframes, making the automotive chassis of this invention significantly more convenient and less expensive to repair.

Although an exemplary embodiment has been shown and described, one of ordinary skill in the art may make many changes, modifications, and substitutions without necessarily departing from the spirit and scope of the invention.

What is claimed is:

1. An automotive chassis, comprising:
   a main frame having a forward end, a rearward end, a midsection intermediate the forward and rearward ends, a first side extending from a left side of the midsection to the forward end, a second side extending from a right side of the midsection to the forward end, a third side extending from the left side of the midsection to the rearward end, and a fourth side extending from the right side of the midsection to the rearward end, the midsection having a first width and the forward end having a second width less than one-half the first width;
   a first subframe on which is mounted a left-front wheel and associated suspension components, the first subframe occupying a position along the first side of the main frame;
   a second subframe on which is mounted a right-front wheel and associated suspension components, the second subframe occupying a position along the second side of the main frame; and
   means for holding the first and second subframes on the main frame so that each of the first and second subframes will break away from the main frame when subjected to an impact of predetermined characteristics.

2. An automotive chassis as recited in claim 1, wherein the first and second sides converge at the forward end.

3. An automotive chassis as recited in claim 1, wherein the rearward end of the main frame has a third width less than one-half the first width.

4. An automotive chassis as recited in claim 3, wherein the third and fourth sides converge at the rearward end.

5. An automotive chassis as recited in claim 3, further comprising:
   a third subframe on which is mounted a left-rear wheel and associated suspension components, the third subframe occupying a position along the third side of the main frame;
   a fourth subframe on which is mounted a right-rear wheel and associated suspension components, the fourth subframe occupying a position along the fourth side of the main frame; and
   means for holding the third and fourth subframes on the main frame so that each of the third and fourth subframes will break away from the main frame when subjected to an impact of predetermined characteristics.

6. An automotive chassis as recited in claim 5, further comprising a first rotational drive component on at least one of the subframes, a second rotational drive component on the main frame, and shaft coupling means for coupling the first rotational drive component to the second rotational drive component.

7. An automotive chassis as recited in claim 1, further comprising a first steering linkage on at least one of the subframes, a second steering linkage on the main frame, and linkage coupling means for coupling the first steering linkage to the second steering linkage.

8. An automotive chassis as recited in claim 1, wherein the means for holding the first and second subframes on the main frame includes:

means in the form of interlocking first and second components attached to respective ones of the first subframe and the main frame for preventing transnational movement of the first subframe relative to the main frame both vertically and sideways; and means in the form of a shear pin extending through the first and second components for preventing forward and rearward transnational movement of the first subframe relative to the main frame;

the shear pin being adapted to shear off when the first subframe is subjected to an impact of the predetermined characteristics in order to thereby enable the first subframe to separate from the main frame in response to the impact.

9. An automotive chassis, comprising:

a main frame having a forward end, a rearward end, a midsection intermediate the forward and rearward ends, a first side extending from a left side of the midsection to the forward end, a second side extending from a right side of the midsection to the forward end, a third side extending from the left side of the midsection to the rearward end, and a fourth side extending from the right side of the midsection to the rearward end, the midsection having a first width and the forward end having a second width less than one-half the first width;

a first subframe on which is mounted a left-front wheel, the first subframe occupying a position along the first side of the main frame;

a second subframe on which is mounted a right-front wheel, the second subframe occupying a position along the second side of the main frame; and means for holding the first and second subframes on the main frame so that each of the first and second subframes will break away from the main frame if it is subjected to an impact of predetermined characteristics.

10. An automotive chassis, comprising:

a main frame;

a first subframe on which is mounted a left-front wheel;

a second subframe on which is mounted a right-front wheel;

means for holding the first subframe on the main frame while enabling the first subframe to separate from the main frame if the first subframe is subjected to an impact of predetermined characteristics; and means for holding the second subframe on the main frame while enabling the second subframe to separate from the main frame if the second subframe is subjected to an impact of predetermined characteristics.

* * * * *